United States Patent
Takeuchi et al.

(10) Patent No.: US 7,103,385 B2
(45) Date of Patent: Sep. 5, 2006

(54) MOBILE SATELLITE COMMUNICATION SYSTEM

(75) Inventors: Norio Takeuchi, Tokyo (JP); Izuru Naitou, Tokyo (JP); Eiichi Sakai, Tokyo (JP); Yutaka Shimawaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/541,033

(22) PCT Filed: Oct. 30, 2003

(86) PCT No.: PCT/JP03/13912
§ 371 (c)(1),
(2), (4) Date: Jun. 28, 2005

(87) PCT Pub. No.: WO2005/043779
PCT Pub. Date: May 12, 2005

(65) Prior Publication Data
US 2006/0046638 A1    Mar. 2, 2006

(51) Int. Cl.
H04B 1/38    (2006.01)
(52) U.S. Cl. ............... 455/562.1; 455/12.1; 342/372
(58) Field of Classification Search ............ 455/562.1, 455/12.1, 13.2, 23, 42, 193, 249, 3.02, 427; 342/372, 373, 368
See application file for complete search history.

(56) References Cited

U.S. PATENT DOCUMENTS

| | | | | |
|---|---|---|---|---|
| 6,085,067 A | * | 7/2000 | Gallagher et al. | 455/13.1 |
| 6,201,961 B1 | * | 3/2001 | Schindall et al. | 455/430 |
| 6,430,390 B1 | * | 8/2002 | Davarian et al. | 455/10 |
| 7,004,666 B1 | * | 2/2006 | Kozlovski | 403/252 |

FOREIGN PATENT DOCUMENTS

| | | |
|---|---|---|
| JP | 02-274004 | 11/1990 |
| JP | 7-283638 | 10/1995 |
| JP | 9-138272 | 5/1997 |
| JP | 2002-141849 | 5/2002 |

\* cited by examiner

Primary Examiner—Marsha D. Banks-Harold
Assistant Examiner—Nghi H. Ly
(74) Attorney, Agent, or Firm—Oblon, Spivak, McClelland, Maier & Neustadt, P.C.

(57) ABSTRACT

In a moving body satellite communication apparatus for performing communication with a satellite by an antenna with a radome mounted on a moving body such as an aircraft, loss due to transmission through the radome, and distortion of polarization characteristics are compensated in the inside of the antenna. Variable phase shifters 9a and 9b and variable attenuators 19a and 19b, and variable phase shifters 10a and 10b and variable attenuators 20a and 20b are respectively controlled as one body in each channel, and the whole power EIRP radiated from the antenna is also optimally controlled by a common variable attenuator 21 inserted independently from the variable attenuators 19a and 19b, and therefore, radome correction and EIRP control can be simultaneously realized by a relatively simple circuit.

5 Claims, 5 Drawing Sheets

MOBILE SATELLITE COMMUNICATION SYSTEM

TECHNICAL FIELD

The present invention relates to a moving body satellite communication apparatus, and particularly to a moving body satellite communication apparatus in which in an antenna with a radome mounted on a moving body such as an aircraft, loss due to transmission through the radome, and distortion of polarization characteristics are compensated in the inside of the antenna.

BACKGROUND ART

In general, in a case where a radome is placed over an antenna, in order to resolve the deterioration of antenna radiation characteristics due to the radome, a hemispherical radome curved surface is adopted so that even if the antenna is rotated, the incident angle of an electric wave becomes constant.

However, in an antenna with a radome mounted on a moving body such as an aircraft, since the height of the radome is restricted, the hemispherical curved surface of the constant incident angle as stated above can not be adopted, and accordingly, the loss due to the transmission of an electric wave through the radome, and the characteristic deterioration must be accepted.

That is, FIG. 1 is a schematic view showing an example of an antenna with a radome mounted on an aircraft. Since an antenna 1 and a radome 2 are mounted on the outside of an airframe 3, the anisotropic radome is adopted which has the lowest possible air resistance and has a streamline shape as shown in the drawing. Thus, when an electric wave is transmitted through the radome, as shown in FIG. 2, attenuation occurs in the output of the electric wave radiated from the antenna, and a shift occurs in the plane of polarization. For example, with respect to the electric wave having the plane of polarization of a horizontal polarization H1 and a vertical polarization V1 before the transmission through the radome, the shift of the plane of polarization by a certain phase angle as indicated by H2 and V2 can occur by the transmission through the radome, or the attenuation of the output as indicated by V2 can occur by the transmission through the radome. The degree of the shift of the plane of polarization and the attenuation of the output is largely affected by the frequency and directivity of the electric wave at that time, not to mention the position and shape of the radome.

FIG. 3 is a structural view of a conventional moving body satellite communication apparatus having a polarization plane control circuit disclosed in JP-A-2002-141849. In the drawing, a radome 2 is the foregoing anisotropic radome, and an antenna apparatus 1 includes a well-known main reflecting mirror 4, a secondary reflecting mirror 5, and a horn antenna 6. Reference numerals 7 and 8 denote 90° phase combiners for performing division into/composition of two channels while a phase of 90° is kept; 9a, 9b, 10a and 10b, variable phase shifters each inserted in a control system divided into the two channels and for phase shifting output signals of the 90° phase combiners 7 and 8; 11a and 11b, high-power amplifiers (HPA) for amplifying output signals of the variable phase shifters 9a and 9b; 12a and 12b, low-noise amplifiers (LNA) for amplifying output signals of an after-mentioned 90° phase combiner 14; 13, a 90° phase combiner for phase combining output signals of the high-power amplifiers 11a and 11b; 14, a 90° phase combiner for phase combining selection signals from after-mentioned diplexers 15 and 16; 15 and 16, diplexers for switching between transmission and reception and for separating/combining signals; 17, an orthomode transducer for functioning as an interface between the signal circuit and the antenna, which is also called a positive mode transducer; and 18, an antenna control circuit for performing a polarization angle adjustment of the antenna and other satellite tracking control of the antenna.

Next, the operation of this circuit will be described. In the case where the moving body satellite communication apparatus is mounted on an aircraft, since the relative positional relation to a satellite changes from moment to moment, it is necessary that the direction of a beam is always pointed toward the satellite by adjusting the polarization angle of the antenna 1. Now, when a transmitter signal to be transmitted to the satellite is inputted to a transmission side Tx terminal of FIG. 3, it is divided by the 90° phase combiner 7 into two channels having components orthogonal to each other, and the respective phases are independently controlled by the variable phase shifters 9a and 9b. The antenna control circuit 18 calculates the pointing direction of the antenna on the basis of the absolute position information of the aircraft and the position information of the satellite, and adjusts the phase quantities of the variable phase shifters 9a, 9b, 10a and 10b to achieve a desirable antenna polarization angle. Incidentally, the output electric wave from the antenna, that is, the effective isotropic radiated power (hereinafter referred to as EIRP) is kept at a definite value determined by a setting instruction value.

In the conventional antenna system as stated above, consideration is not given to an influence on the attenuation of an electric wave and the shift of the plane of polarization when it is transmitted through the anisotropic radome, and accordingly, no measures against this have been taken.

DISCLOSURE OF THE INVENTION

The present invention has been made in view of this point, and in a moving body satellite communication apparatus including an antenna mounted on a moving body and having an anisotropic radome, 90° phase combiners connected to the antenna and constituting control systems of at least two channels for each of transmission and reception, a variable phase shifter inserted in each of the control systems of the two channels, a first variable attenuator connected in series to the variable phase shifter, and an antenna control circuit for performing attitude control of the antenna according to a relative positional relation between the moving body and a satellite, the antenna control circuit includes a first correction table storing radome correction data for frequencies and polarization angles of the antenna, and the variable phase shifter and the first variable attenuator are controlled by referring to the first correction table, and further, a second variable attenuator inserted at an input side of the transmission side 90° phase combiner is provided, the antenna control circuit includes a second correction table having correction values to influence by control of the first variable attenuator upon EIRP, and the second variable attenuator is controlled by referring to the second correction table.

Further, in the invention, a high-power amplifier connected in series to the variable phase shifter provided at the transmission side and for amplifying transmission power of the variable phase shifter is provided, the antenna control circuit includes a third correction table storing correction data for influence of a saturation characteristic of the amplifier, and the variable phase shifter and the first variable attenuator are controlled by referring to this.

BEST MODE FOR CARRYING OUT THE INVENTION

Figure 1:
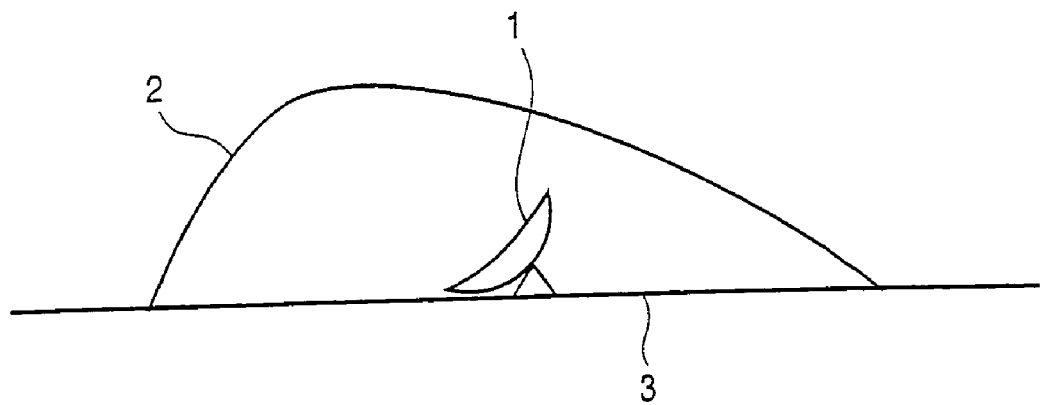
FIG. 1 is a schematic view showing an example of an antenna with a radome mounted on an aircraft.
Figure 2:
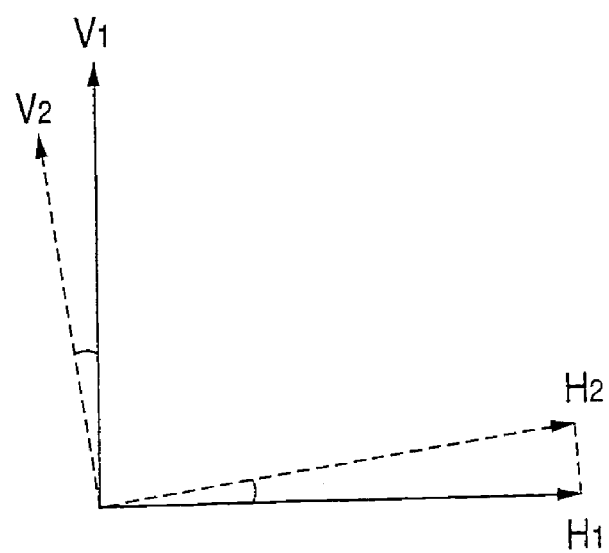
FIG. 2 is a view for explaining a state of loss and polarization characteristic change due to transmission through a radome.
Figure 3:
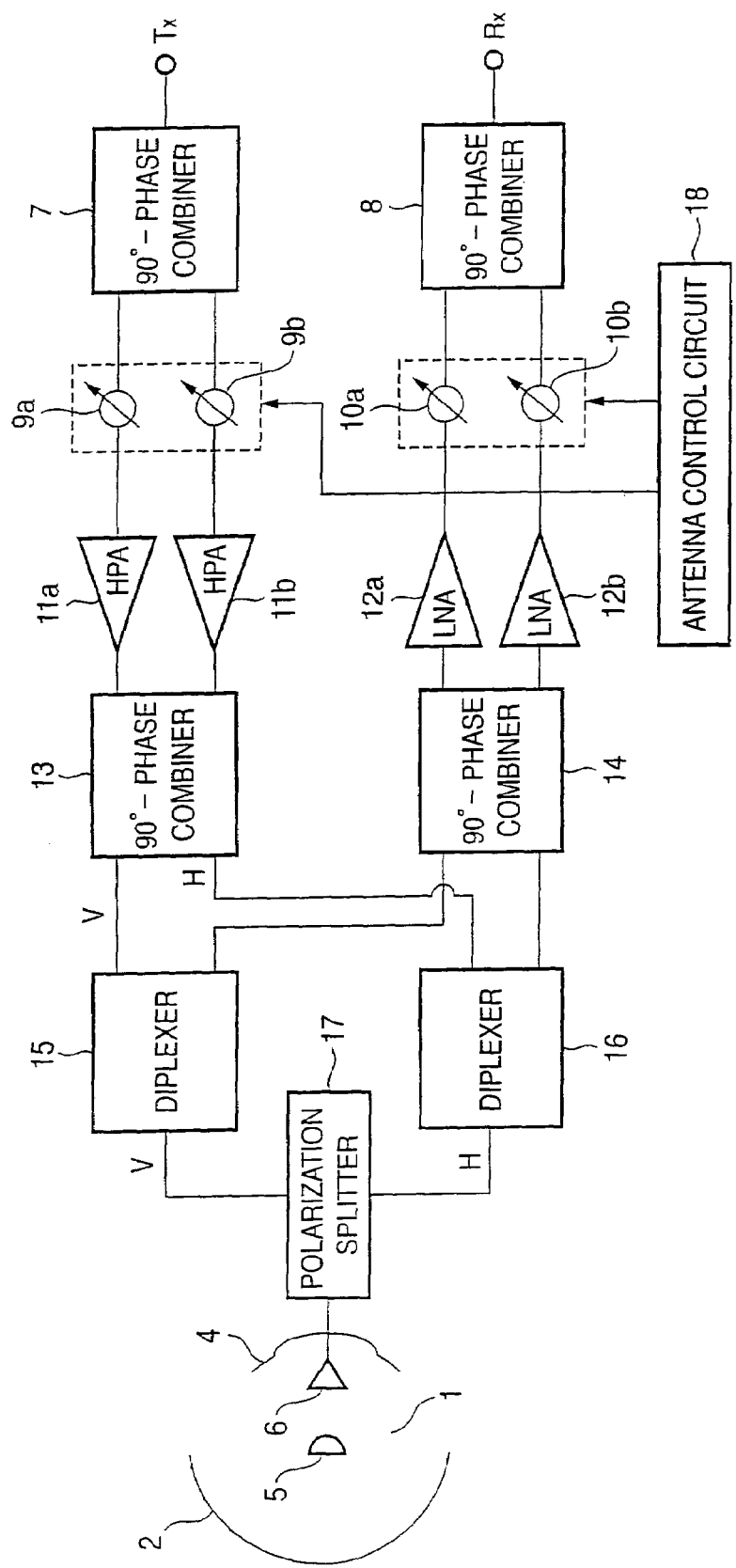
FIG. 3 is a structural view of a moving body satellite communication apparatus relating to attitude control of a conventional antenna.
Figure 4:
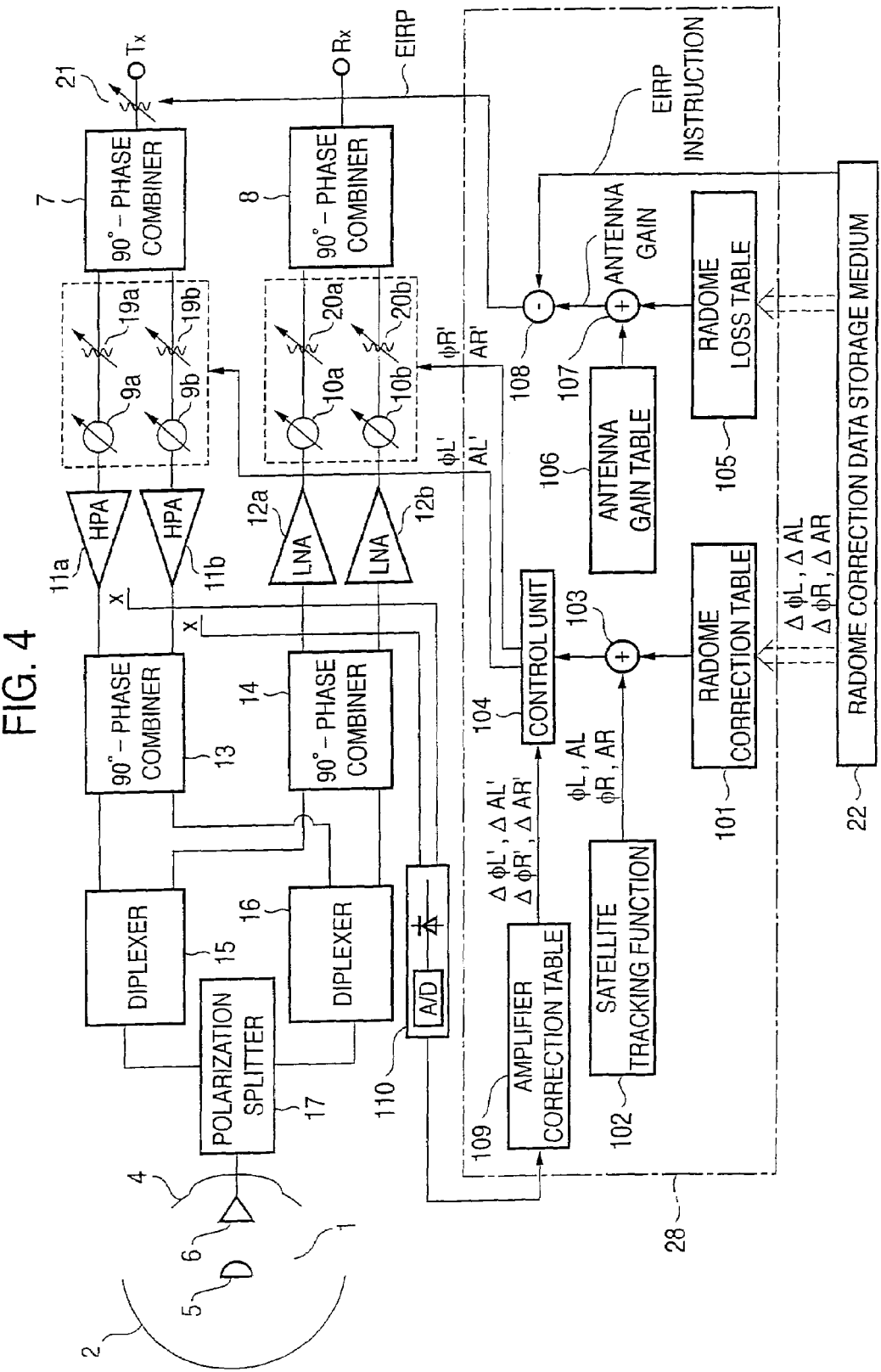
FIG. 4 is a structural view of a moving body satellite communication apparatus according to an embodiment of the invention.

FIG. 4 is a structural view of an antenna system according to an embodiment of the invention. Structural portions similar to the conventional apparatus described in FIG. 3 are denoted by the same characters, and here, with emphasis on newly added novel portions in relation to radome correction, their structure will be described. In the drawing, reference numerals 19a and 19b denote variable attenuators inserted in series to transmission side variable phase shifters 9a and 9b; 20a and 20b, variable attenuators inserted in series to reception side variable phase shifters 10a and 10b; 21, a variable attenuator inserted to an input side of a 90° phase combiner 7; and 22, a storage medium of data relating to radome correction. When, for example, a transmitter signal to a satellite is inputted to a Tx terminal, it enters the 90° phase combiner 7 through the variable attenuator 21, and is divided into two channels there. The variable phase shifters 9a and 9b and the variable attenuators 19a and 19b are inserted in series to each other in the respective channels, and the phases and amplitudes of the respective channels are independently controlled in the respective channels. With respect to this control, also in a serial body of the variable phase shifters 10a and 10b inserted at a reception side and the variable attenuators 20a and 20b, the phases and amplitudes are similarly independently controlled in the respective channels.

Besides, needless to say, the antenna control circuit 28 includes, similarly to a conventional one, a satellite tracking function circuit 102 which calculates a pointing direction of the antenna on the basis of the absolute position information of the aircraft and the position information of the satellite, and adjusts phase quantities of the variable phase shifters 9a, 9b, 10a and 10b so that a desirable polarization angle of the antenna is obtained. Further, in this invention, measures as described below are taken against problems of the attenuation of an electric wave radiated from the antenna at the time of transmission through a radome and the shift of the plane of polarization.

That is, in correspondence to the polarization angle of the antenna and the electric wave frequency, radome characteristic data for the change of directivity (pointing angle) of the antenna is measured in advance, and is stored, as radome correction data (offset settings) calculated from this, in a radome correction table 101 of the antenna control circuit 28. More particularly, the directivity (direction) of the antenna at a certain frequency f and polarization angle θ is variously changed, and as compared with a case where there is no radome, the shift of a phase angle and the change of a transmission amplitude due to the influence of the radome are measured. The reason why the change of the transmission amplitude is also measured is that when the phase is changed, the transmission amplitude of the phase shifter is also changed according to that. On the basis of this measurement, the radome correction table is created in which a transmission side correction phase angle ΔΦL, a reception side correction phase angle ΔΦR, a transmission side correction amplitude value ΔAL, and a reception side correction amplitude value ΔAR are written. This radome correction data is separately stored in a computer or is stored in the portable recording medium 22 (this may be any medium), and this radome correction data is data transferred or is downloaded from the computer or the recording medium 22 to the radome correction table 101 of the antenna control circuit 28.

Figure 5:
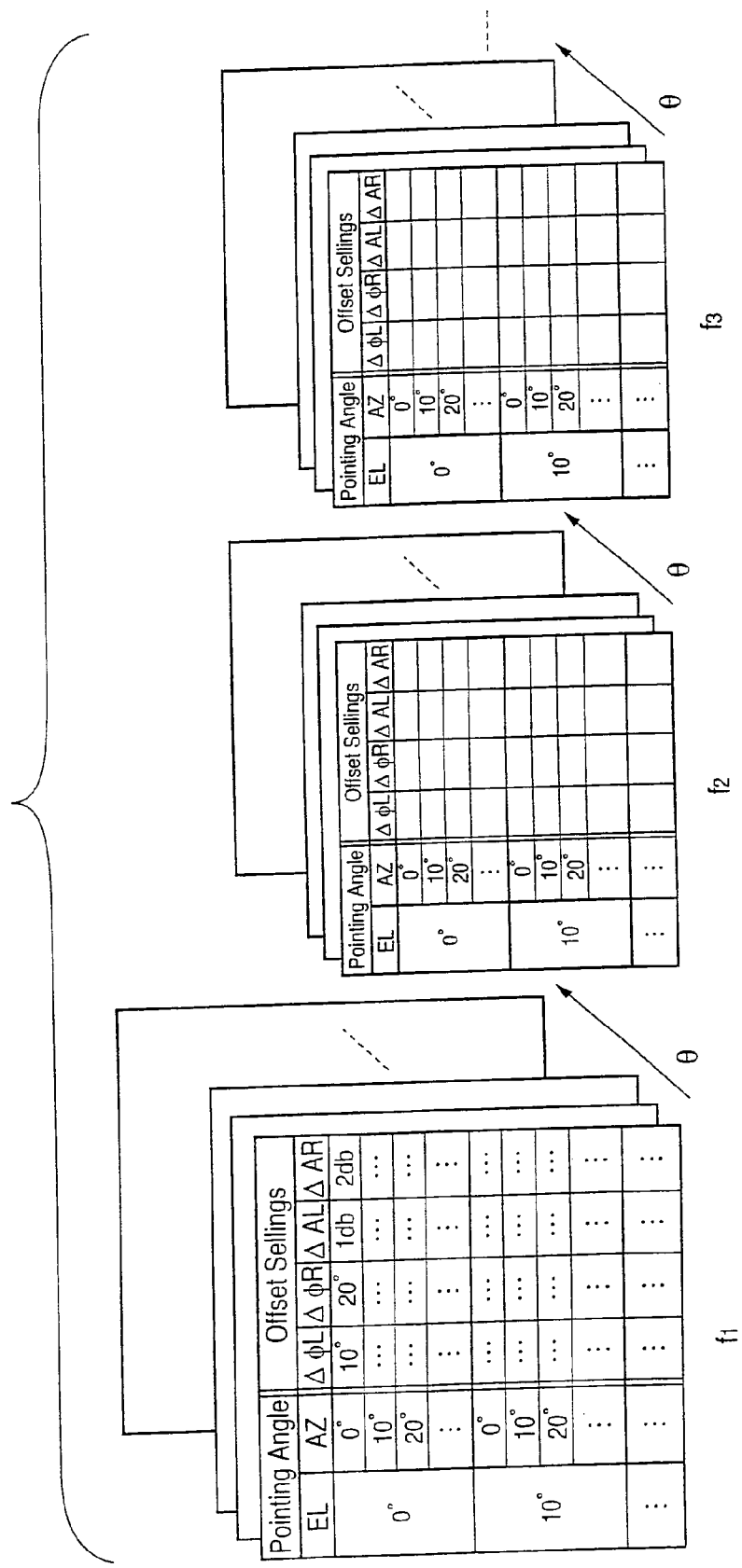
FIG. 5 is a rough explanatory view showing an example of a radome correction table.

FIG. 5 is a conceptual view showing an example of the radome correction table 101, which is an example of a table in which in correspondence to the frequencies f1, f2, f3 . . . and various polarization angles θ, the transmission side correction phase angle ΔΦL, the reception side correction phase angle ΔΦR, the transmission side correction amplitude value ΔAL, and the reception side correction amplitude value ΔAR are written. For example, in the drawing, a record is made such that when, as the polarization angle θ, an elevation angle (EL) is 0° and an azimuth angle (AZ) is 0°, the transmission side correction phase angle (offset) is 10°, the reception side correction phase angle is 20°, the transmission side correction amplitude value is 1 dB, and the reception side correction amplitude value is 2 dB. As is apparent from the drawing, the normal output of the satellite tracking function circuit 102 which is conventionally operated, and the output of the radome correction table 101 are combined with each other by a combining circuit 103, and the resultant enters a control unit 104.

Incidentally, the change of the transmission power by the variable attenuators 19a and 19b in the respective channels results in significant influence on the whole power EIRP radiated from the antenna. The effective isotropic radiated power (EIRP) as the intensity of the electric wave radiated from the transmission antenna to all directions in space is expressed by a following expression.

$$EIRP = \text{antenna gain} + \text{output power of transmitter} - \text{radome loss}$$

That is, the antenna gain, the output power of the transmitter, and the radome loss are important factors to determine the EIRP.

In the best mode of the invention, the variable attenuator 21 to perform the amplitude control of the whole transmitter is provided at the input terminal of the transmitter signal Tx, and an EIRP control circuit to control the variable attenuator 21 is provided in the antenna control circuit 28. This EIRP control circuit includes a radome loss table 105, an antenna gain table 106, combining circuits 107 and 108, and the like. The influence of the foregoing variable attenuators 19a and 19b upon the EIRP is corrected in the form of the radome loss and the antenna gain. That is, the radome loss table 105 and the antenna gain table 106 have correction values to the influence by the variable attenuators 19a and 19b upon the EIRP, the combining circuits 107 and 108 refer to these, EIRP instructions are given to the common variable attenuator 21, and the amplitude control of the whole transmitter is performed.

Incidentally, a relation between an amplitude change quantity ($\Delta ATT$) of the variable attenuator 21 in this case and the amplitude correction values $\Delta AL$ and $\Delta AR$ of the radome is expressed by a following expression.

$$\Delta ATT = -\log\{(10^{(\Delta AL/10)} + 10^{(\Delta AR/10)})/2\}$$

In the above expression, all of $\Delta ATT$, $\Delta AL$ and $\Delta AR$ are dB values, and for example, in the case of $\Delta AL=+2$ dB and $\Delta AR=-2$ dB, $\Delta ATT$ becomes $-0.45$ dB.

By this, since the radome correction by the foregoing radome correction table can be performed while the influence by the radome correction upon the EIRP does not occur, the more sophisticated radome correction can be realized.

Further, in the best mode of the invention, the antenna control circuit 28 includes an amplifier correction table 109, and resolves the influence of the high power saturation characteristics of the high-power amplifiers 11a and 11b upon the radome.

Figure 6:
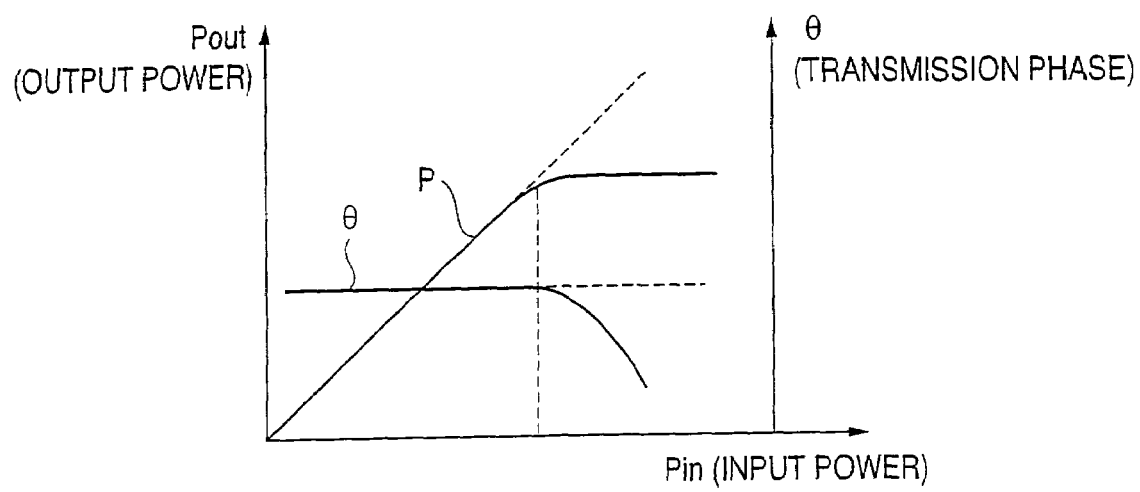
FIG. 6 is a characteristic view showing an output saturation characteristic of a high-power amplifier.

That is, in the high-power amplifiers 11a and 11b, as shown in FIG. 6, there is a tendency that the output characteristics are saturated in a high output area. When the output characteristics are saturated, the transmission phases $\theta$ from the phase shifters 9a and 9b are also lowered, and this influences the whole transmission/reception system in both the amplitude and phase. The amplifier correction table 109 of FIG. 4 has data to correct the influence upon the amplitude and phase generated by the saturation characteristics. Each of the outputs of the high-power amplifiers 11a and 11b is monitored, this can be captured through a control circuit 110 including a wave detector and an A/D converter, reference is made to a value on the correction table 109 corresponding to the output power value at that time, and a transmission side correction phase angle $\Delta\Phi L'$, a transmission side correction amplitude value $\Delta AL'$, a reception side correction phase angle $\Delta\Phi R'$, and a reception side amplitude value $\Delta AR'$ are outputted as instruction values to the control unit 104.

The control unit 104 outputs, in addition to the various control instructions ($\Phi L$, $AL$, $\Phi R$, $AR$) by the conventional satellite tracking function circuit 102, the control instructions while referring to the radome correction table 101 and the amplifier correction table 109. The control unit 104 finally outputs, as the control instruction values, the correction phase angle $\Phi L'$ to control the transmission side variable phase shifters 9a and 9b, the correction amplitude value $AL'$ to control the transmission side attenuators 19a and 19b, the correction phase angle $\Phi R'$ to control the reception side variable phase shifters 10a and 10b, and the correction amplitude value $AR'$ to control the reception side attenuators 20a and 20b. Accordingly, by this, the higher accuracy radome correction in consideration of the saturation characteristics of the amplifiers as well can be realized.

The invention claimed is:

1. A moving body satellite communication apparatus comprising:
    an antenna mounted on a moving body and including an anisotropic radome;
    90° phase combiners connected to the antenna and constituting control systems of at least two channels for each of transmission and reception;
    a variable phase shifter inserted in each of the control systems of the two channels;
    a first variable attenuator connected in series to the variable phase shifter; and
    an antenna control circuit for performing attitude control of the antenna according to a relative positional relation between the moving body and a satellite, characterized in that the antenna control circuit includes:
    a first correction table storing radome correction data for frequencies and polarization angles of the antenna, the variable phase shifter and the first variable attenuator are controlled by referring to the first correction table,
    a second variable attenuator is inserted at an input side of the transmission side 90° phase combiner, and
    a second correction table having correction values to influence by control of the first variable attenuator upon effective isotropic radiated power (EIRP), wherein the second variable attenuator is controlled by referring to the second correction table.

2. A moving body satellite communication apparatus according to claim 1, characterized in that the radome correction data of the first correction table is obtained by variously changing directivity (direction) of the antenna to a frequency f and a polarization angle $\theta$ and by measuring a shift of a phase angle and a change of a transmission amplitude due to influence of the radome.

3. A moving body satellite communication apparatus according to claim 1, characterized in that the second correction table includes an antenna gain table and a radome loss table, and each of the tables is made to have the correction values to the influence by the first variable attenuator upon the effective isotropic radiate power (EIRP).

4. A moving body satellite communication apparatus according to claim 1, characterized by comprising a high-power amplifier connected in series to the variable phase shifter provided at the transmission side and for amplifying transmission power of the variable phase shifter, wherein the antenna control circuit includes a third correction table storing correction data for influence of a saturation characteristic of the amplifier, and the variable phase shifter and the first variable attenuator are controlled by referring to the third correction table.

5. A moving body satellite communication apparatus according to claim 4, characterized in that the third correction table has correction values of an amplitude and a phase to the influence generated by the saturation characteristic of the amplifier upon the radome correction data.

* * * * *